United States Patent

Matsunaga et al.

(10) Patent No.: US 10,144,418 B2
(45) Date of Patent: Dec. 4, 2018

(54) CONTROL APPARATUS FOR VEHICLE

(71) Applicant: TOYOTA JIDOSHA KABUSHIKI KAISHA, Toyota-shi, Aichi-ken (JP)

(72) Inventors: Yasutaka Matsunaga, Toyota (JP); Yuma Hoshikawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 43 days.

(21) Appl. No.: 15/133,860

(22) Filed: Apr. 20, 2016

(65) Prior Publication Data

US 2016/0339909 A1  Nov. 24, 2016

(30) Foreign Application Priority Data

May 18, 2015 (JP) .................................. 2015-101201

(51) Int. Cl.
*B60W 30/09* (2012.01)
*G01S 13/93* (2006.01)
*B60T 7/22* (2006.01)

(52) U.S. Cl.
CPC ........... *B60W 30/09* (2013.01); *G01S 13/931* (2013.01); *B60T 7/22* (2013.01); *B60T 2201/022* (2013.01); *B60T 2210/32* (2013.01); *G01S 2013/9346* (2013.01)

(58) Field of Classification Search
None
See application file for complete search history.

(56) References Cited

U.S. PATENT DOCUMENTS

| 2006/0267830 A1 | 11/2006 | O'Boyle |
| 2008/0042894 A1* | 2/2008 | Kikuchi .............. B60W 10/184 342/71 |
| 2009/0027180 A1 | 1/2009 | Shibata et al. |
| 2012/0271484 A1 | 10/2012 | Feit et al. |
| 2014/0025285 A1 | 1/2014 | Trombley |

FOREIGN PATENT DOCUMENTS

| JP | 2008-168698 A | 7/2008 |
| JP | 2009-031053 A | 2/2009 |
| JP | 2009-133780 A | 6/2009 |
| JP | 2014-006071 A | 1/2014 |

* cited by examiner

*Primary Examiner* — Mussa A Shaawat
*Assistant Examiner* — Abdhesh K Jha
(74) *Attorney, Agent, or Firm* — Oliff PLC

(57) ABSTRACT

A disclosed control apparatus used for a host vehicle includes a radar apparatus, a control execution part configured to perform a predetermined control to reduce a probability of a collision between the object and the host vehicle based on information about the object from the radar apparatus; and a prevention part configured to prevent the predetermined control related to a first object when the radar apparatus simultaneously detects the first object and a second object at different distances and a difference between a lateral position of the first object and the lateral position of the second object is smaller than a predetermined value, the first object being closer to the host vehicle than the second object, the lateral position being determined in a lateral direction with respect to a traveling direction of the host vehicle.

5 Claims, 10 Drawing Sheets

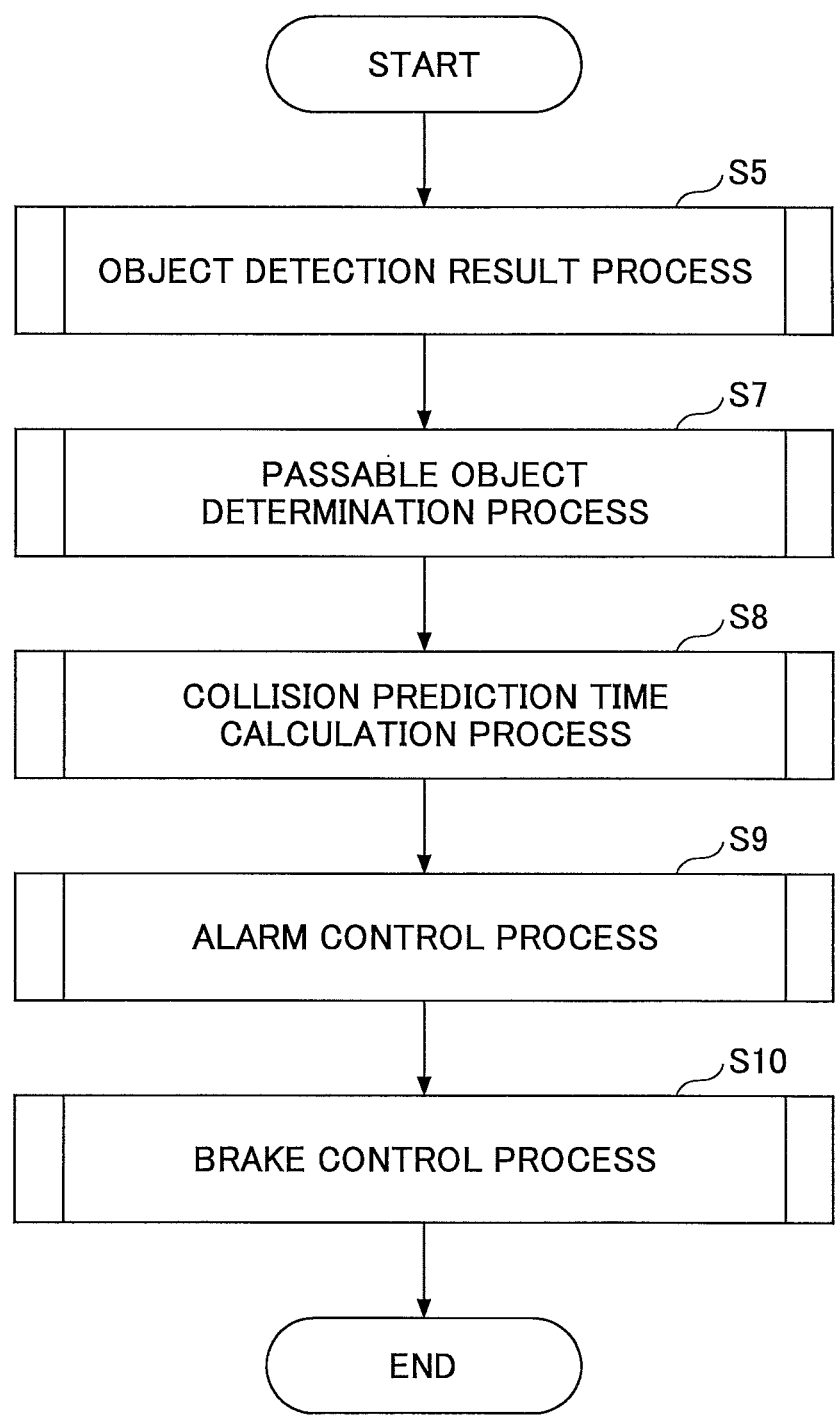

FIG.6

| OBJECT NUMBER k | DISTANCE [m] | RELATIVE SPEED [km/h] | LATERAL POSITION [m] | ATTRIBUTE 1 | ATTRIBUTE 2 |
|---|---|---|---|---|---|
| 1 | 20 | 10 | 0.5 | NON-VEHICLE | STATIONARY OBJECT |
| 2 | 30 | 20 | -0.5 | VEHICLE | MOVING OBJECT |
| ... | ... | ... | ... | ... | ... |
| N | 40 | 30 | 1 | VEHICLE | MOVING OBJECT |

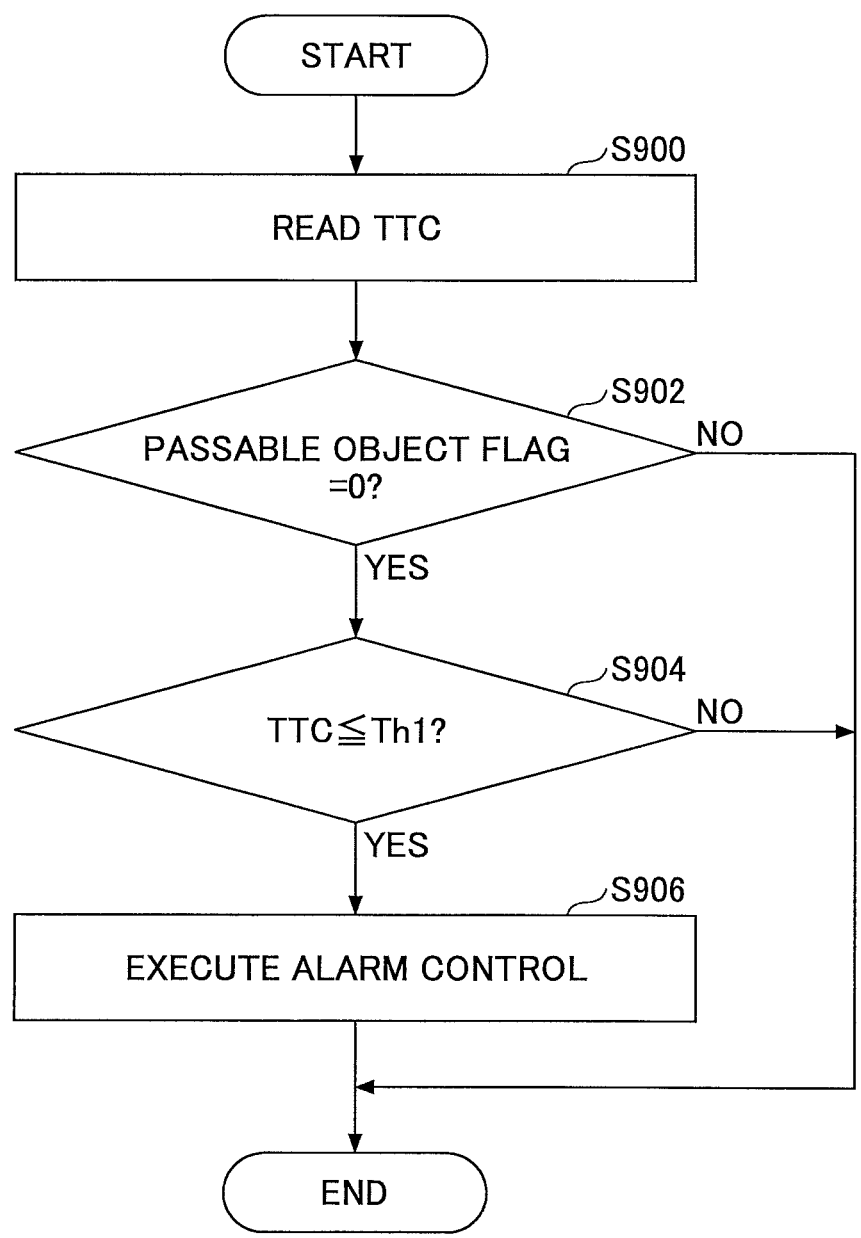

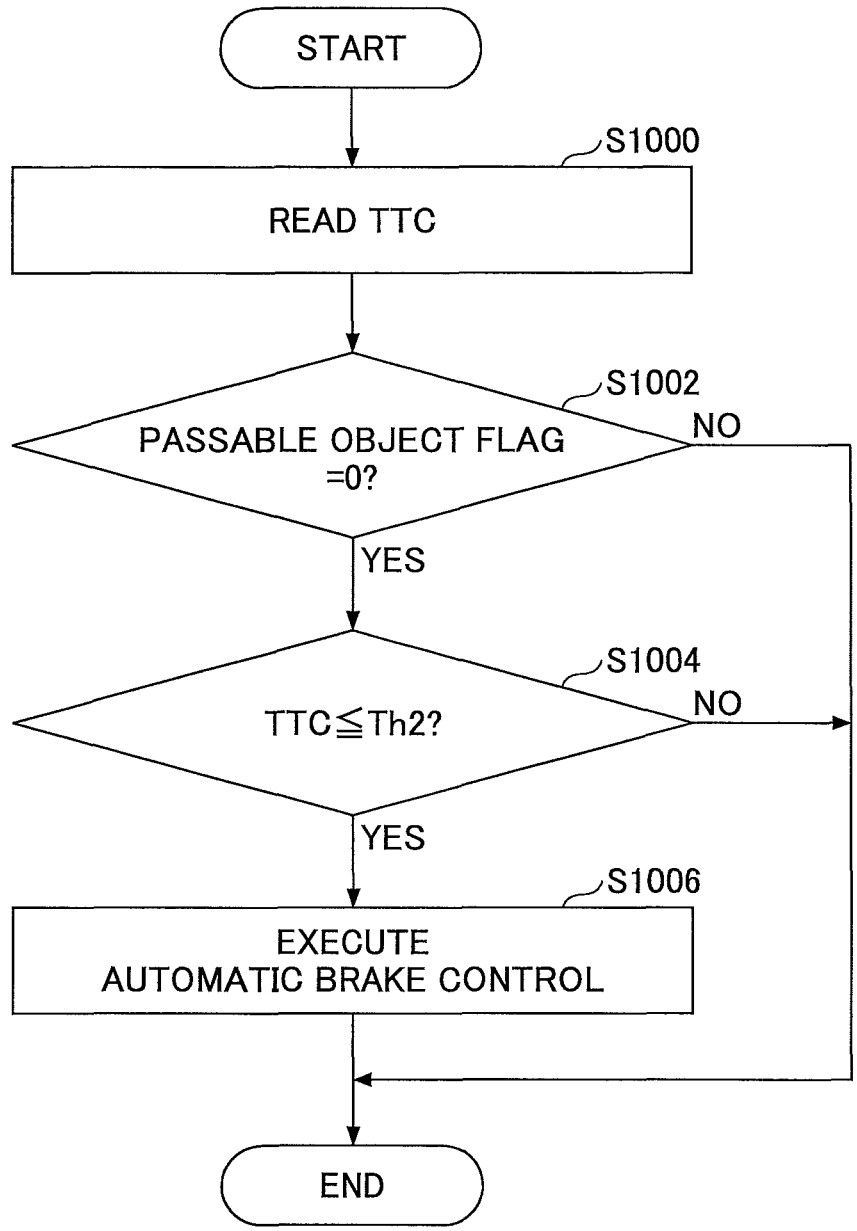

CONTROL APPARATUS FOR VEHICLE

CROSS REFERENCE TO RELATED APPLICATION

The present application is based on and claims the benefit of priority of Japanese Priority Application No. 2015-101201, filed on May 18, 2015, the entire contents of which are hereby incorporated by reference.

FIELD

The disclosure is related to a control apparatus used for a host vehicle.

BACKGROUND

When a radar apparatus detects an upper object under which a vehicle can pass through, such as a pedestrian bridge, or an on-road object above which a vehicle can pass through without any trouble, such as a lid of a manhole, there may be probability that alarm control or deceleration control is performed uselessly if such an object is regarded as an obstacle. In order to reduce such a probability, Japanese Laid-open Patent Publication No. 2014-6071 discloses an apparatus that calculates power of received waves and a distance from a radar apparatus to an object based on an output of the radar apparatus, calculates a correlation coefficient between the power and the distance, and determines that the object detected by the radar apparatus is an upper object under which a vehicle can pass through upon the calculated correlation coefficient falling within a predetermined range.

In the case of an upper object (merely referred to as "an upper object", hereinafter) under which a vehicle can pass through, such a trend can be seen that the power of the received waves at the radar apparatus decreases as the distance between a host vehicle and the object decreases. On the other hand, the trend does not easily appear in the case where the object is not an upper object. Japanese Laid-open Patent Publication No. 2014-6071 utilizes such findings to determine whether the object is an upper object. However, the upper object may have various shapes, sizes, etc., and thus there may be objects that cannot be determined as upper objects, depending on the shapes, etc., of the objects.

Determining an object (also referred to as "passable object", hereinafter) through which the host vehicle can pass as an obstacle, which may cause an execution of control (also referred to as "predetermined control", hereinafter) for reducing the collision probability between an obstacle and the host vehicle, such as an alarm control, a deceleration control, and a stop control, becomes problematic when the radar apparatus simultaneously detects two objects (i.e., a first object and a second object) with different distances and one of the objects, which is closer to the host vehicle, is the passable object. This is because, when the predetermined control is executed uselessly in a situation where there is an obstacle such as a preceding vehicle ahead of a passable object, a driver may believe that the predetermined control is executed with respect to the obstacle and thus may not believe that the predetermined control is executed in error. In this case, the driver may easily feel strange because the obstacle exists at the position where the predetermined control is not executed in a normal state. On the other hand, in a situation where there is not an obstacle and only the passable object exists, the driver may easily understand that the predetermined control is executed in error. Further, in a situation where there is the passable object ahead of the obstacle, the predetermined control is to be executed with respect to the obstacle prior to the passable object, which is not problematic.

Therefore, an object of the disclosure is to reduce a probability of execution of a predetermined control for reducing a probability of a collision with respect to a passable object in a situation where a first object and a second object are detected simultaneously by a radar apparatus and the first object, which is closer to a host vehicle than the second object, is a passable object.

SUMMARY

According to one aspect of the disclosure, a control apparatus used for a host vehicle is provided, which includes:

a radar apparatus configured to detect an object near the host vehicle;

a control execution part configured to perform a predetermined control to reduce a probability of a collision between the object and the host vehicle based on information about the object from the radar apparatus; and a prevention part configured to prevent the predetermined control related to a first object when the radar apparatus simultaneously detects the first object and a second object at different distances and a difference between a lateral position of the first object and the lateral position of the second object is smaller than a predetermined value, the first object being closer to the host vehicle than the second object, the lateral position being determined in a lateral direction with respect to a traveling direction of the host vehicle.

BRIEF DESCRIPTION OF DRAWINGS

FIG. 4 is a flowchart illustrating an example of a process executed by a control device 10.

FIG. 6 is a diagram illustrating an example of object information.

FIG. 9 is a flowchart illustrating an example of a process executed by an alarm control execution part 14.

FIG. 10 is a flowchart illustrating an example of a process executed by a brake control execution part 16.

DESCRIPTION OF EMBODIMENTS

In the following, the best mode for carrying out the present invention will be described in detail by referring to the accompanying drawings.

Figure 1:
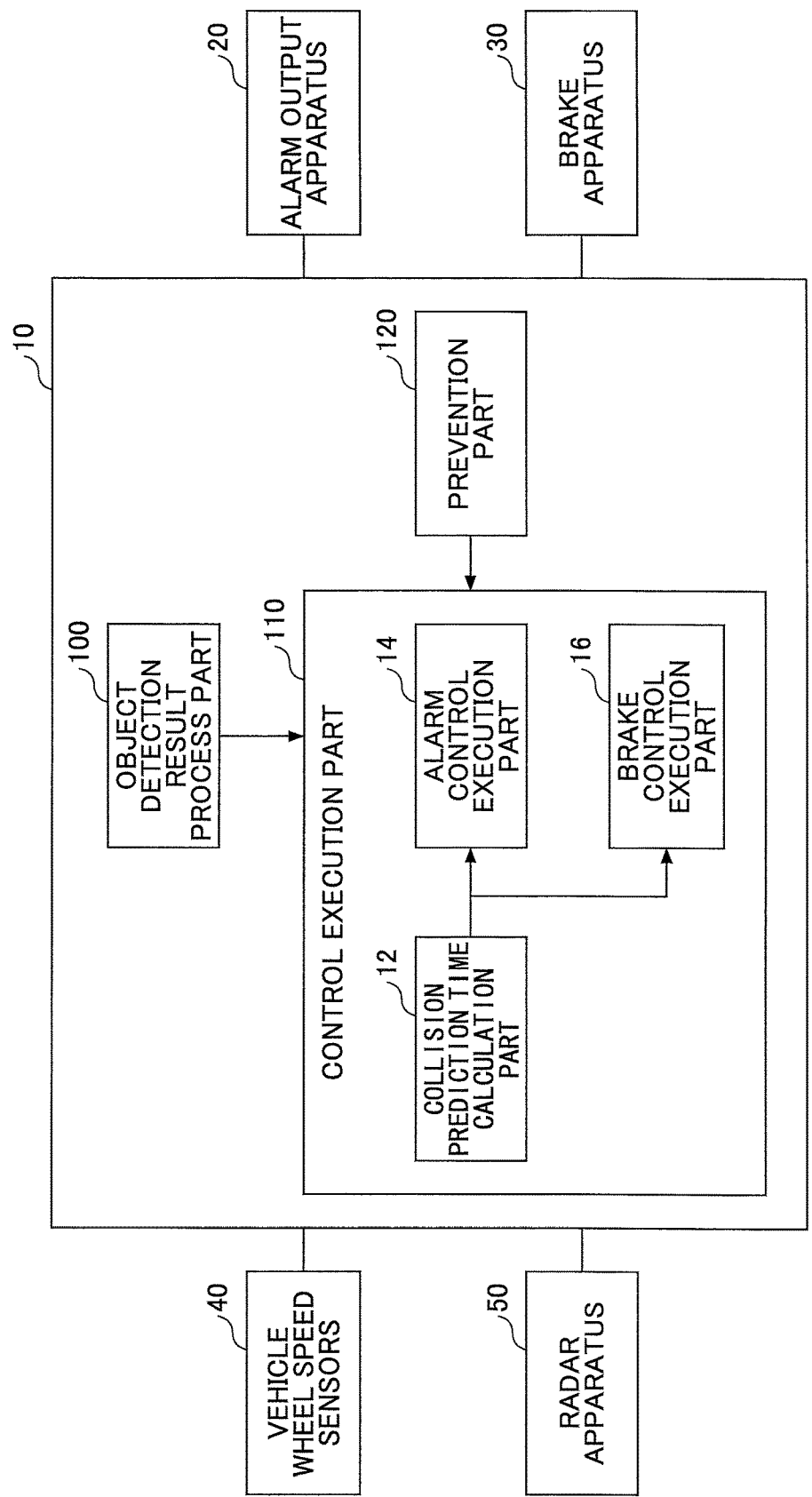
FIG. 1 is a diagram illustrating a vehicle system to which a control apparatus used for a host vehicle according to an embodiment is applied.

FIG. 1 is a diagram illustrating a vehicle system 1 to which a control apparatus used for a host vehicle according to an embodiment is applied. The vehicle system 1 includes a control device 10, an alarm output apparatus 20, a brake apparatus 30, vehicle wheel speed sensors 40 and a radar apparatus 50. The control device 10 and the radar apparatus 50 form an example of a control apparatus used for a host vehicle.

The control device 10 includes a computer. The control device 10 is coupled to the alarm output apparatus 20, the brake apparatus 30, the vehicle wheel speed sensors 40 and the radar apparatus 50.

The alarm output apparatus 20 outputs the alarm with a sound and/or an image. The alarm output apparatus 20 includes a buzzer, a display, etc.

The brake apparatus 30 includes an ECU (Electronic Control Unit) (not illustrated) and an oil hydraulic circuit (not illustrated). The brake apparatus 30 generates a brake force according to an automatic braking demand from the control device 10. The oil hydraulic circuit of the brake apparatus 30 is configured to be capable of performing an automatic brake control. For example, the oil hydraulic circuit of the brake apparatus 30 includes a pump and an accumulator to generate high pressure oil. At the time of the automatic brake control, valves such as a master cylinder cut solenoid valve, the pump, etc., are controlled to increase wheel cylinder pressures of wheel cylinders. Further, the oil hydraulic circuit of the brake apparatus 30 may be equal to a configuration that is used for a brake by wire system such as an ECB (Electric Control Braking).

The vehicle wheel speed sensors 40 detect rotational speed of the respective wheels. The vehicle wheel speed sensors 40 each are provided for the respective wheels, for example.

Figure 2:
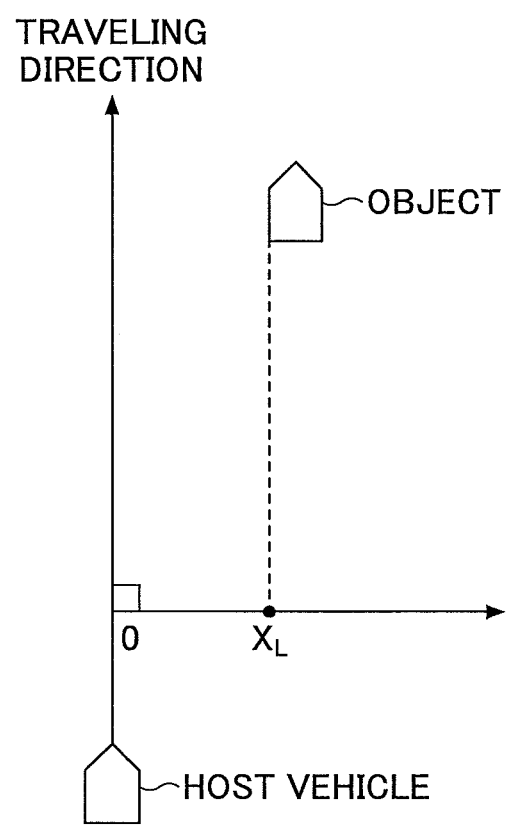
FIG. 2 is a diagram describing a lateral position in a schematic plan view.

The radar apparatus 50 detects information representing a relationship between an object ahead of a host vehicle and the host vehicle. For example, the radar apparatus 50 emits a scanning detection wave to detect a state of the object in front of the host vehicle. An electric wave (millimeter wave, for example), a light wave (laser, for example) or an ultrasonic wave may be used as a detection wave. The radar apparatus 50 detects information which represents a relationship between the object and the host vehicle such as a relative speed, a distance and a lateral position with respect to the host vehicle, for example, at a predetermined cycle. It is noted that the lateral position is based on a traveling direction of the host vehicle, as conceptually illustrated in FIG. 2. The lateral position corresponds to a distance xL between a position of the object the radar apparatus 50 detects and a position of an intersection of a normal to the traveling direction of the host vehicle from the position of the object. However, the lateral position can be expressed by an angle between a direction of a line from the position of the object to the host vehicle and the traveling direction of the host vehicle. In the following, the lateral position is a distance [m] in a lateral direction based on a traveling direction of the host vehicle, and a positive direction and a negative direction of a sign of the distance correspond to the right side and left side, respectively. The information that represents the relationship between the object and the host vehicle is transmitted to the control device 10 at a predetermined cycle. It is noted that any functions of the radar apparatus 50 (a function of calculating the position of the object, for example) may be implemented by the control device 10.

The control device 10 includes an object detection result process part 100, a control execution part 110, and a prevention part 120.

The object detection result process part 100 processes a detection result of the radar apparatus 50. It is noted that a part of or all of the functions of the object detection result process part 100 may be included in the radar apparatus 50. The process result of the object detection result process part 100 is used in the control execution part 110 and the prevention part 120. The process of the object detection result process part 100 is described hereinafter.

The control execution part 110 includes a collision prediction time calculation part 12, an alarm control execution part 14, and a brake control execution part 16.

The collision prediction time calculation part 12 calculates a collision prediction time of a collision between the object and the host vehicle based on the information (i.e., the distance and the relative speed between the object and the host vehicle) obtained from the radar apparatus 50. The collision prediction time is to a TTC (Time to Collision) that corresponds to the time left before the collision of the host vehicle with the object. The TTC may be derived by dividing the distance to the object by the relative speed with respect to the object.

The alarm control execution part 14 controls the alarm output apparatus 20. The alarm control execution part 14 performs an alarm control when the TTC is less than or equal to a first threshold Th1. The alarm control outputs the alarm via the alarm output apparatus 20.

The brake control execution part 16 controls the brake apparatus 30. The brake control execution part 16 executes automatic bake control upon the TTC being less than or equal to a second threshold Th2. The second threshold Th2 may be the same as the first threshold Th1; however, preferably, the second threshold Th2 is smaller than the first threshold Th1. For example, the automatic bake control increases the wheel cylinder pressures of the wheel cylinders under a situation where an operation of a brake pedal (not illustrated) is not performed by the driver or an operated stroke of the brake pedal is smaller than a predetermined threshold. The brake control execution part 16 outputs an automatic bake control demand to the brake apparatus 30 upon the TTC being less than or equal to the second threshold Th2.

The prevention part 120 prevents the control (i.e., the alarm control and the automatic brake control) of the control execution part 110 related to a first object when the radar apparatus simultaneously detects the first object and a second object at different distances and a difference (absolute value) between a lateral position of the first object and the lateral position of the second object is smaller than a predetermined value. In this case, the first object is closer to the host vehicle than the second object. This is because, as described with reference to FIG. 3 hereinafter, when such a condition is met, a probability that the first object is an object (also referred to as "passable object", hereinafter) through which the host vehicle can pass is high.

Figure 3A:
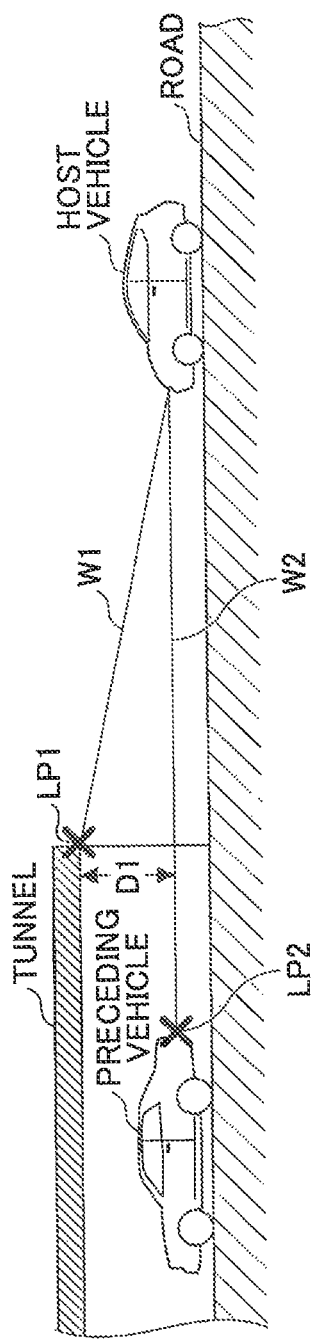
FIG. 3A is a diagram schematically illustrating an example of a scene in which a radar apparatus 50 simultaneously detects two objects at different distances.
Figure 3B:
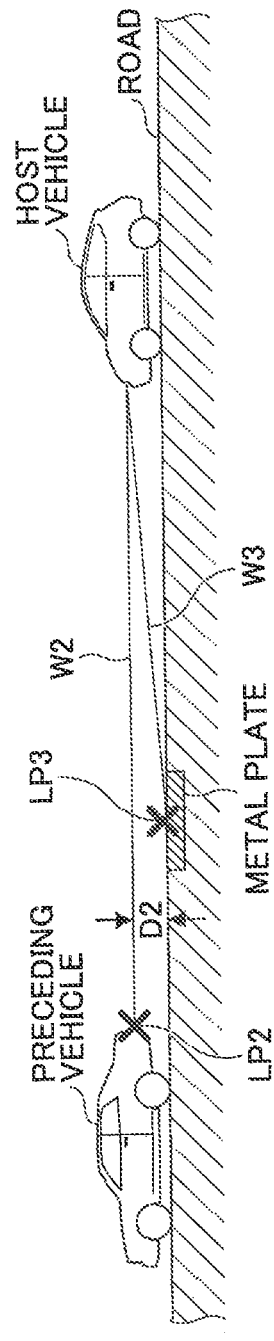
FIG. 3B is a diagram schematically illustrating another example of a scene in which a radar apparatus 50 simultaneously detects two objects at different distances.
Figure 3C:
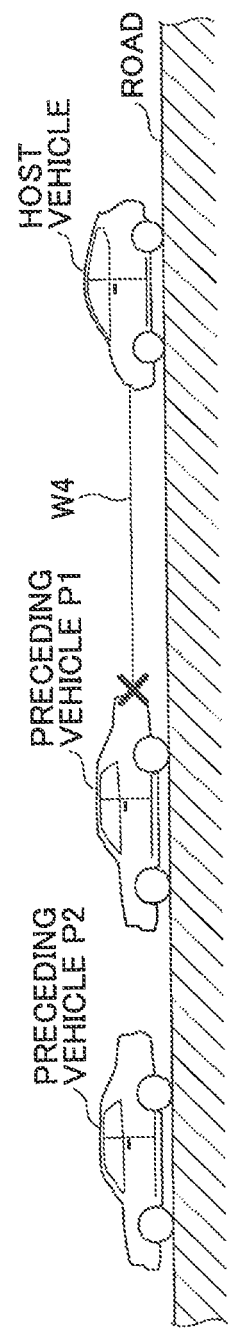
FIG. 3C is a diagram schematically illustrating yet another example of a scene in which a radar apparatus 50 simultaneously detects two objects at different distances.

FIG. 3A through FIG. 3C are diagrams schematically illustrating examples of a scene in which the radar apparatus 50 simultaneously detects two objects at different distances. FIG. 3A through FIG. 3C are diagrams schematically illustrating states on a road, viewed from a side of the host vehicle, and in a cross-sectional view along the traveling direction of the host vehicle (however, the host vehicle and preceding vehicles are not illustrated in a cross-sectional view). Thus, the preceding vehicles and a metal plate illustrated in FIG. 3A through FIG. 3C exist on a traveling lane of the host vehicle.

In FIG. 3A, such a scene is illustrated in which there is a tunnel, which is an example of an upper object having a passable space therein, and the preceding vehicle travels in the tunnel. In such a scene, there may be a case where the tunnel and the preceding vehicle are detected as objects simultaneously by the radar apparatus 50. This is because the detection wave of the radar apparatus 50 has a spread to some degree in nature, which causes the tunnel, which is not an object to be detected, to be detected as an object. In FIG. 3A, the detection wave W2 with which the preceding vehicle is detected and the detection wave W1 with which the tunnel is detected are schematically illustrated. It is noted that the preceding vehicle is detected because there is a detection wave, such as the detection wave W2, that can travel in the tunnel. Thus, such a scene causes an increased probability that two objects (i.e., the tunnel and the preceding vehicle) at different distances are detected though the difference D1 (absolute value) in even the lateral position (LP1, LP2) between these two objects is small.

In FIG. 3B, such a scene is illustrated in which there is a metal plate (a metal plate provided at a joint point between road elements, for example) ahead of the host vehicle, and the preceding vehicle travels ahead of the metal plate. The metal plate is an example of an upper object having a passable space thereon (i.e., an object on a road whose height with respect to the road is not substantial). In such a scene, there may be a case where the metal plate and the preceding vehicle are detected as objects simultaneously by the radar apparatus 50. This is because the detection wave of the radar apparatus 50 has a spread to some degree in nature, which causes the metal plate, which is not an object to be detected, to be detected as an object. In FIG. 3B, the detection wave W2 with which the preceding vehicle is detected and the detection wave W3 with which the metal plate is detected are schematically illustrated. It is noted that the preceding vehicle is detected because there is a detection wave, such as the detection wave W2, that can travel above the metal plate. Thus, such a scene causes an increased probability that two objects (i.e., the metal plate and the preceding vehicle) at different distances are detected even though the difference D2 (absolute value) in the lateral position (LP2, LP3) between these two objects is small.

In FIG. 3C, such a scene is illustrated in which the first preceding vehicle P1 travels ahead of the host vehicle, and the second preceding vehicle P2 travels ahead of the first preceding vehicle P1. In such a scene, the probability that the first preceding vehicle P1 and the second preceding vehicle P2 are detected simultaneously as objects is low. This is because the detection wave of the radar apparatus 50 is blocked by the first preceding vehicle P1 and thus does not easily reach the second preceding vehicle P2. Further, even if the detection wave reaches the second preceding vehicle P2, the reflection wave thereof is blocked by the first preceding vehicle P1 and thus does not easily reach the radar apparatus 50 of the host vehicle. Thus, such a scene does not cause an increased probability that two objects (i.e., the first preceding vehicle P1 and the second preceding vehicle P2) at different distances are detected even though the difference (absolute value) in the lateral position between these two objects is small.

According to the embodiment, as described above, the prevention part 120 prevents the alarm control and the automatic brake control of the control execution part 110 related to the first object, which is closer to the host vehicle than the second object, when the radar apparatus 50 simultaneously detects the first object and the second object at different distances and a difference (absolute value) between a lateral position of the first object and the lateral position of the second object is smaller than a predetermined value. With this arrangement, it becomes possible to reduce the probability that the alarm control and the automatic brake control are performed with respect to the passable object that is detected by the radar apparatus 50. Specifically, it becomes possible to reduce the probability that the alarm control and the automatic brake control are performed with respect to the passable object such as the upper object whose lower portion has the passable space as illustrated in FIG. 3A, and the on-road object having the passable space thereon as illustrated in FIG. 3B.

Next, with reference to FIG. 4 through FIG. 10, an example of an operation of the control apparatus is described.

FIG. 4 is a flowchart illustrating an example of a process executed by the control device 10. The process illustrated in FIG. 4 is performed at a predetermined cycle.

In step S5, the object detection result process part 100 of the control device 10 performs an object detection result process to process the detection result of the radar apparatus 50. The object detection result process is described hereinafter.

In step S7, the prevention part 120 of the control device 10 performs a passable object determination process based on the process result of the object detection result process part 100. The passable object determination process is described hereinafter.

In step S8, the collision prediction time calculation part 12 of the control device 10 performs a collision prediction time calculation process based on the process result of the object detection result process part 100. The collision prediction time calculation process is described hereinafter.

In step S9, the alarm control execution part 14 of the control device 10 performs an alarm control process based on the process result of the prevention part 120 and the process result of the collision prediction time calculation part 12. The alarm control process is described hereinafter.

In step S10, the brake control execution part 16 of the control device 10 performs a brake control process based on the process result of the prevention part 120 and the process result of the collision prediction time calculation part 12. The brake control process is described hereinafter.

Figure 5:
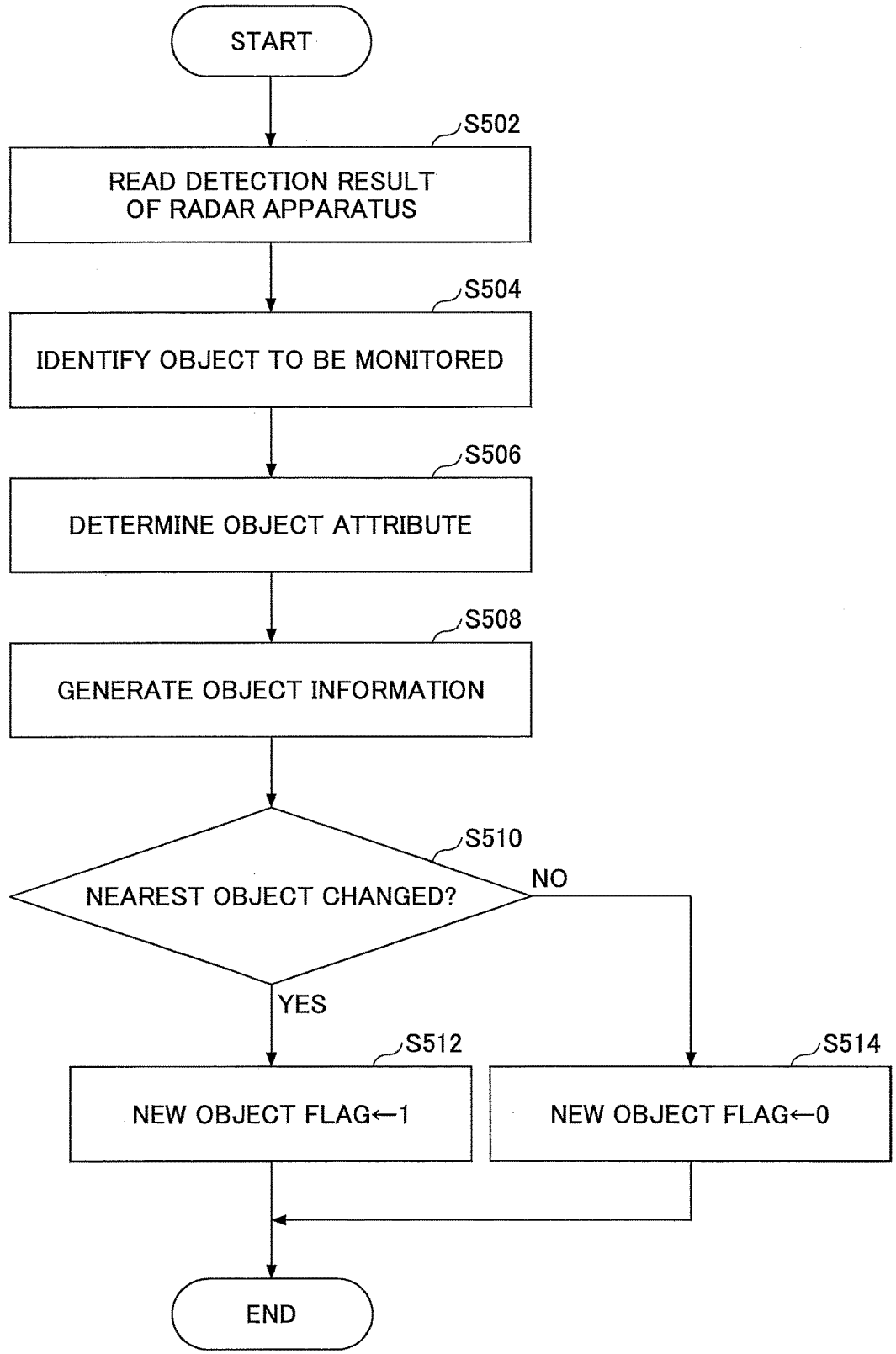
FIG. 5 is a flowchart illustrating an example of a process executed by an object detection result process part 100.

FIG. 5 is a flowchart illustrating an example of a process executed by the object detection result process part 100. The process in FIG. 5 is executed as the process of step S5 in FIG. 4.

In step S502, the object detection result process part 100 reads the latest detection result of the radar apparatus 50.

In step S504, the object detection result process part 100 identifies the object to be monitored based on the read detection result of the radar apparatus 50. The object to be monitored is an object that has a probability of collision with the host vehicle. For example, the object to be monitored is identified by removing reflection points related to noise, etc. Further, the object to be monitored has the lateral position within a first predetermined range D1. The first predetermined range D1 is greater than minus β [m] and smaller than β, for example. The first predetermined range D1 covers the possible lateral positions of the objects that have the probability of the collision with the host vehicle, and may be adapted by the experiments, etc. In the following, the identified object to be monitored is merely referred to as "an object".

In step S506, the object detection result process part 100 determines an attribute of the object based on the detection result of the radar apparatus 50. The attribute of the object is whether the object is a vehicle, and whether the object is stationary. Whether the object is a vehicle can be determined based on a length (in the traveling direction) of a group of the reflection points, etc., for example. For example, the object detection result process part 100 determines that the object is a vehicle when the length of the group of the reflection points is greater than or equal to a predetermined length. This is because the detection wave can travel below the vehicle to be reflected at a bottom surface of the vehicle, which causes a tendency that the length of the group of the reflection points corresponds to the length of the vehicle. Whether the object is stationary can be determined based on whether a state in which the relative speed and the vehicle speed of the host vehicle are substantially the same continues. This is because the relative speed with respect to the stationary object tends to be substantially the same as the vehicle speed of the host vehicle continuously. It is noted that if no object is detected in step S504, the process of step S506 is omitted.

In step S508, the object detection result process part 100 generates object information based on the results of step S502 through step S506 to store the generated object information. The object information includes such information illustrated in FIG. 6, for example. In this example, the object detection result process part 100, when a plurality of objects are detected, allocates object numbers k (=1, 2, ...) to the detected objects in such order that the object whose distance is smaller is given the lower object number. Further, the object detection result process part 100 associates the object number with the information of the object including the distance, the relative speed, the lateral position and the attribute of the object. It is noted that the distance used to allocate the object numbers is the distance detected by the radar apparatus 50 or the distance toward the position of the intersection of the normal to the traveling direction of the host vehicle from the position of the object, for example. It is noted that if no object is detected in step S504, the process of step S508 is omitted.

In step S510, the object detection result process part 100 determines whether there is a change in the object whose distance is the smallest (i.e., the object whose object number is 1). Such a change includes a case where the object whose distance is the smallest disappears (i.e., the object is lost by the radar apparatus 50), a case where another object becomes closest to the host vehicle, etc. If it is determined that there is a change in the object whose distance is the smallest, the process routine goes to step S512, otherwise the process routine goes to step S514. It is noted that if no object is detected in step S504, the process routine goes to step S514.

In step S512, the object detection result process part 100 sets a new object flag to "1". An initial value of the new object flag is "0".

In step S514, the object detection result process part 100 resets the new object flag to "0".

Figure 7:
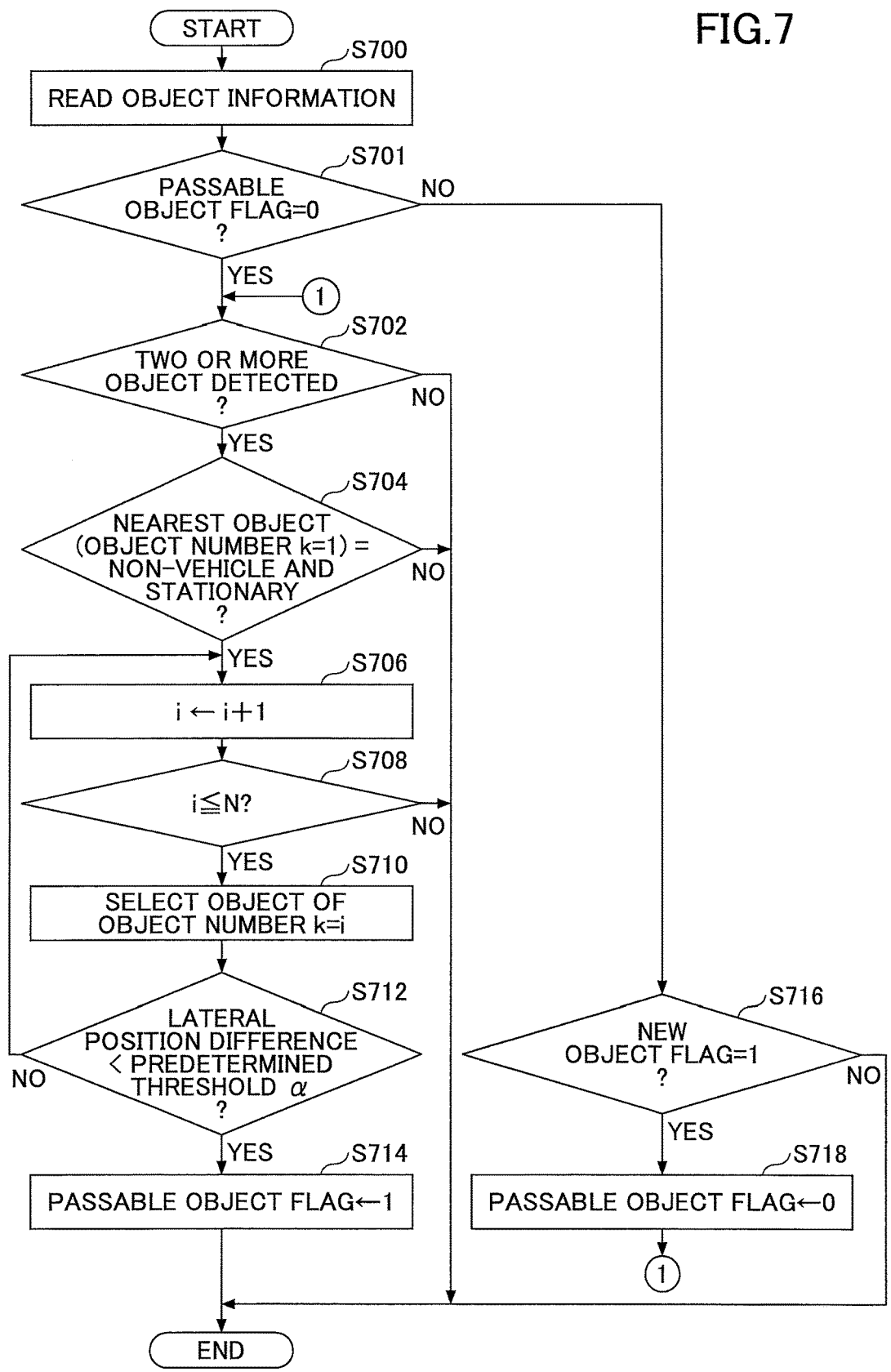
FIG. 7 is a flowchart illustrating an example of a process executed by a prevention part 120.

FIG. 7 is a flowchart illustrating an example of a process executed by the prevention part 120. The process in FIG. 7 is executed as the process of step S7 in FIG. 4.

In step S700, the prevention part 120 reads the object information generated by the object detection result process part 100.

In step S701, the prevention part 120 determines whether a passable object flag is "0". An initial value of the passable object flag is "0". As described hereinafter, when the passable object flag is "1", the control (i.e., the alarm control and the automatic brake control) by the control execution part 110 is prevented. If it is determined that the passable object flag is "0", the process routine goes to step S702, otherwise the process routine goes to step S716.

In step S702, the prevention part 120 determines, based on the object information, whether two or more objects are detected. If it is determined that two or more objects are detected, the process routine goes to step S704, otherwise the process routine directly ends.

In step S704, the prevention part 120 determines, based on the object information, whether the object whose object number is 1 (i.e., the object closest to the host vehicle) is other than the vehicle and stationary. If it is determined that the object whose object number is 1 is other than the vehicle and stationary, the process routine goes to step S706, otherwise the process routine directly ends.

In step S706, the prevention part 120 increments a value i (whose initial value is 1) by 1.

In step S708, the prevention part 120 determines whether the value i is less than or equal to the number of the detected objects (i.e., the maximum number of the object number k). If it is determined that the value i is less than or equal to the number of the detected objects, the process routine goes to step S710, otherwise the process routine directly ends.

In step S710, the prevention part 120 selects the object whose object number is i.

In step S712, the prevention part 120 determines, based on the object information, whether the difference (absolute value) between the lateral position of the selected object and the lateral position of the object of the object number 1 is smaller than a predetermined threshold $\alpha$ [m]. In the following, the difference (absolute value) between the lateral position of the selected object and the lateral position of the object whose the object number is 1 is merely referred to as "a lateral position difference". The predetermined threshold $\alpha$ corresponds to the maximum value of a range in which the lateral position difference could change when the object travels on the same lane as the host vehicle. The predetermined threshold $\alpha$ may be adapted by the experiments, etc. If it is determined that the lateral position difference is smaller than the predetermined threshold $\alpha$, the process goes to step S714, otherwise the process goes to step S706. In this way, until i becomes equal to N+1 or the determination result of step S712 becomes "YES", the process from step S706 through 712 is repeated.

In step S714, the prevention part 120 determines that the object whose object number is 1 is the passable object to set the passable object flag to "1".

In step S716, the prevention part 120 determines whether the new object flag is "1". The new object flag being "1" means that there is a change in the object whose object number is 1, as described above (see "YES" in step S510). If it is determined that the new object flag is "1", the process routine goes to step 718.

In step S718, the prevention part 120 resets the passable object flag to "0". After the process of step S718, the process from step S702 is executed.

According to the process illustrated in FIG. 7, the prevention part 120 sets the passable object flag to "1" (step S714) when the radar apparatus 50 detects the object whose object number is 1 and another object at different distances simultaneously ("YES" in step S702) and the difference between the lateral positions of these two objects (i.e., the lateral position difference) is smaller than the predetermined threshold $\alpha$ ("YES" in step S712). Thus, it becomes possible to increase the probability of setting the passable object flag to "1" with respect to the passable object detected by the radar apparatus 50.

Further, according to the process illustrated in FIG. 7, the prevention part 120 sets the passable object flag to "1" under a condition where it is determined that the object whose object number is 1 is other than the vehicle and stationary. This is because there is a high probability that it is determined that the passable object detected by the radar apparatus 50 is other than the vehicle and stationary. Thus, it becomes possible to further increase the probability of setting the passable object flag to "1" with respect to the passable object detected by the radar apparatus 50.

Figure 8:
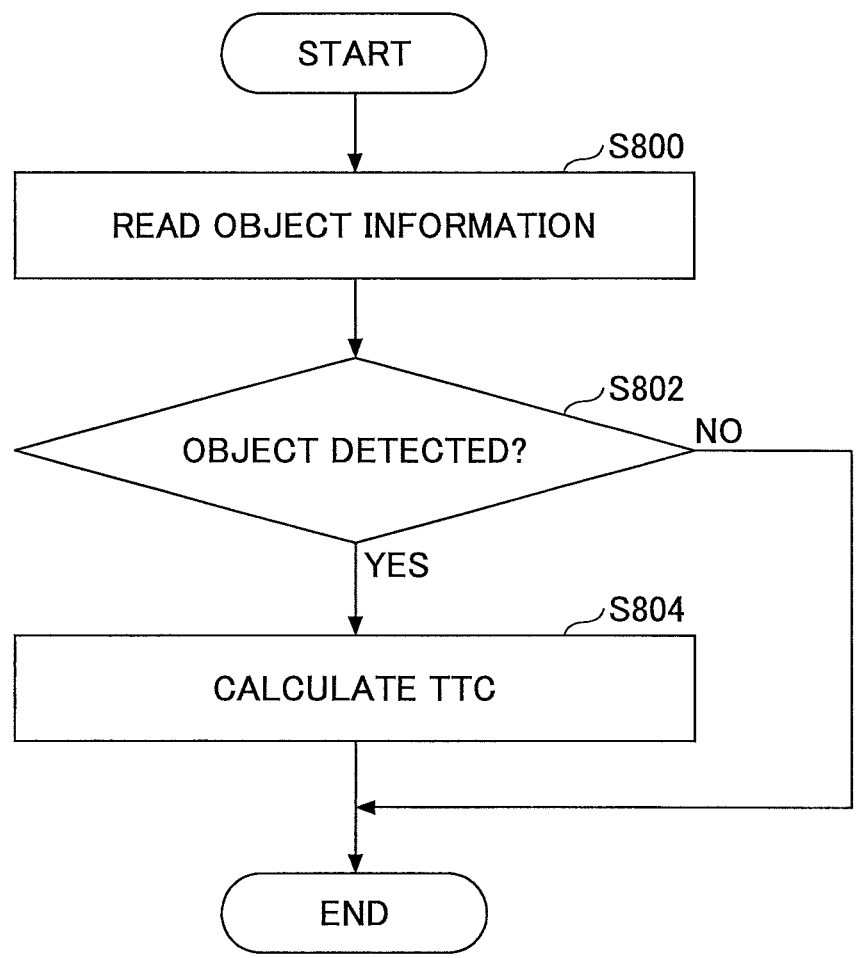
FIG. 8 is a flowchart illustrating an example of a process executed by a collision prediction time calculation part 12.

FIG. 8 is a flowchart illustrating an example of a process executed by a collision prediction time calculation part 12. The process in FIG. 8 is executed as the process of step S8 in FIG. 4.

In step S800, the collision prediction time calculation part 12 reads the object information generated by the object detection result process part 100.

In step S802, the collision prediction time calculation part 12 determines, based on the object information, whether any object is detected. If it is determined that some object is detected, the process routine goes to step S804, otherwise the process routine directly ends. It is noted that when no object is detected, the collision prediction time calculation part 12 sets the TTC to an invalid value ("NULL") and stores the TTC of the invalid value.

In step S804, the collision prediction time calculation part 12 calculates, based on the object information, the TTC with respect to the object whose object number is 1. The collision prediction time calculation part 12 stores the calculated TTC.

FIG. 9 is a flowchart illustrating an example of an alarm control process executed by the alarm control execution part 14. The process in FIG. 9 is executed as the process of step S9 in FIG. 4.

In step S900, the alarm control execution part 14 reads the TTC.

In step S902, the alarm control execution part 14 determines whether the passable object flag is "0". If it is determined that the passable object flag is "0", the process routine goes to step S904, otherwise the process routine directly ends.

In step S904, the alarm control execution part 14 determines whether the TTC is less than or equal to a first threshold Th1. If it is determined that the TTC is less than or equal to the first threshold Th1, the process routine goes to step S906, otherwise the process routine ends directly. It is noted that if the TTC is the invalid value (see "NO" in step S802 in FIG. 8), the process routine ends directly.

In step S906, the alarm control execution part 14 performs the alarm control.

According to the process illustrated in FIG. 9, the alarm control execution part 14 performs the alarm control when the TTC is less than or equal to the first predetermined threshold Th1 and the passable object flag is "0". Thus, it becomes possible to increase the probability of preventing the alarm control with respect to the passable object detected by the radar apparatus 50.

FIG. 10 is a flowchart illustrating an example of a brake control process executed by the brake control execution part 16. The process in FIG. 10 is executed as the process of step S10 in FIG. 4.

In step S1000, the brake control execution part 16 reads the TTC.

In step S1002, the prevention part 16 determines whether the passable object flag is "0". If it is determined that the passable object flag is "0", the process routine goes to step S1004, otherwise the process routine directly ends.

In step S1004, the brake control execution part 16 determines whether the TTC is less than or equal to a second threshold Th2. If it is determined that the TTC is less than or equal to the second threshold Th2, the process routine goes to step S1006, otherwise the process routine ends directly. It is noted that if the TTC is the invalid value (see "NO" in step S802 in FIG. 8), the process routine ends directly.

In step S1006, the brake control execution part 16 performs the automatic brake control.

According to the process illustrated in FIG. 10, the brake control execution part 16 performs the automatic brake control when the TTC is less than or equal to the second predetermined threshold Th2 and the passable object flag is "0". Thus, it becomes possible to increase the probability of preventing the automatic brake control with respect to the passable object detected by the radar apparatus 50.

It is noted that the passable object such as the tunnel and the metal plate described above is easily detected by the radar apparatus 50 when the distance of the passable object is relatively long. This is because the spread of the detection wave in the height direction is small at the near distance, which makes it difficult to detect the passable object with the radar apparatus 50. When the host vehicle travels at high speed, the TTC becomes relatively small even with respect to the relatively farther object, which causes the alarm control, etc., to be easily executed. Thus, the embodiment effectively works when the host vehicle travels at high speed, in particular.

The present invention is disclosed with reference to the preferred embodiments. However, it should be understood that the present invention is not limited to the above-described embodiments, and variations and modifications may be made without departing from the scope of the present invention.

For example, according to the process illustrated in FIG. 7, In step S712, the prevention part 120 determines, based on the object information, whether the difference (absolute value) between the lateral position of the selected object and the lateral position of the object of the object number 1 is smaller than the predetermined threshold α. However, the prevention part 120 may determine, based on the object information, whether the lateral position of the selected object and the lateral position of the object of the object number 1 are respectively within a second predetermined range D2. This is because when the lateral position of the selected object and the lateral position of the object of the object number 1 are respectively within the second predetermined range D2, it can be determined that the difference (absolute value) between the lateral position of the selected object and the lateral position of the object of the object number 1 is smaller than a predetermined value. The second predetermined range D2 may be slightly narrower than the first predetermined range D1 (see step S504) or the same as the first predetermined range D1. It is noted that, if the first predetermined range D1 (see step S504) is the same as the second predetermined range D2, the processes of step S706 through step S712 may be omitted.

Further, in the embodiment described above, the predetermined threshold α may be determined based on road width information (obtained from a navigation apparatus, for example) of the traveling lane of the host vehicle as such α=w−Δw, for example. In this case, w [m] is the width of the travelling lane, and Δw [m] is about 1.5 times of a value that corresponds to the width of the vehicle.

Further, according to the process illustrated in FIG. 7, the prevention part 120 sets the passable object flag to "1", using an additional condition ("AND" condition) that the object whose object number is 1 is other than the vehicle and stationary. However, such an additional condition may be omitted. Alternatively, a part of such an additional condition may be omitted. Specifically, the prevention part 120 may set the passable object flag to "1", using an additional condition that the object whose object number is 1 is other than the vehicle, or using an additional condition that the object whose object number is 1 is stationary. Further, reversely, the prevention part 120 may set the passable object flag to "1" upon another additional condition being met. For example, another additional condition may be such that it is determined, using such a way as disclosed in Japanese Laid-open Patent Publication No. 2014-6071, for example, that the object is an upper object.

Further, as a variant for the process illustrated in FIG. 7, in step S712, the prevention part 120 may determine whether the lateral position difference is smaller than the predetermined threshold α and the distance of the selected object is greater than that of the object whose object number is 1 by a value greater than or equal to a predetermined threshold γ. If it is determined that the lateral position difference is smaller than the predetermined threshold α and the distance of the selected object is greater than that of the object whose object number is 1 by the value greater than or equal to the predetermined threshold γ, the process routine goes to step S714, otherwise the process routine returns to step S706. This is because when the lateral position difference is smaller than the predetermined threshold α and the distance of the selected object is near that of the object whose object number is 1, there is a probability that these two objects are the same object. In this case, for example, the predetermined threshold γ may be set to a value that is longer than the length of the vehicle.

Further, according to the embodiment described above, the alarm control execution part 14 and the brake control execution part 16 are provided; however, the brake control execution part 16 may be omitted, for example. In this case, the process illustrated in FIG. 10 is not executed, and only the alarm control is prevented when the passable object flag is "1".

Further, according to the embodiment described above, when the passable object flag is "1", the automatic brake control and the alarm control are completely prevented; however, when the passable object flag is "1", the automatic brake control and the alarm control may be partly prevented. For example, when the passable object flag is "1", the first threshold Th1 may be corrected to a smaller value. In this case, the automatic brake control is prevented during a period from a timing when the TTC is less than or equal to the pre-correction first threshold Th1 to a timing when the TTC is less than or equal to the corrected first threshold Th1. The second threshold Th2 may be corrected similarly.

Further, in the embodiment described above, the tunnel is described as an example of an upper object that has a lower space through which the vehicle can pass: however, other examples of the upper object may include a road sign, a sign plate, and a pedestrian bridge. Further, in the embodiment described above, the metal plate (a metal plate provided at a joint point between road elements, for example) is described as an example of an on-road object on which the vehicle can pass through: however, other examples of the on-road object may include a manhole, a falling object (without substantial height), etc.

What is claimed is:

1. A control apparatus used for a host vehicle, comprising:
   a radar apparatus configured to detect an object near the host vehicle; and
   a controller configured to
   perform a predetermined control to reduce a probability of a collision between the object and the host vehicle based on information about the object from the radar apparatus; and
   prevent alarm control and automatic brake control in response to the radar apparatus simultaneously detecting a first object and a second object at different distances from the host vehicle in a traveling direction of the host vehicle, the first object being other than a vehicle and stationary, and a difference between a transverse position of the first object and the transverse position of the second object being smaller than a predetermined value, the first object being closer to the host vehicle than the second object, the transverse position being determined in a transverse direction that is perpendicular to the traveling direction of the host vehicle.

2. The control apparatus of claim 1, wherein the controller is configured to prevent the predetermined control when the radar apparatus simultaneously detects the first object and the second object at different distances, the difference is smaller than the predetermined value, and the first object is a stationary object.

3. The control apparatus of claim 1, wherein the predetermined control includes at least one of an automatic brake control for automatically applying a brake force to the host vehicle, and an alarm control for outputting an alarm.

4. The control apparatus of claim 1, wherein
   the predetermined value is set to be smaller than a possible maximum difference in a transverse position between two objects on the same lane.

5. The control apparatus of claim 1, wherein the transverse direction is an up-down direction.

* * * * *